March 10, 1970 D. E. BLAKE 3,499,178
APPARATUS AND REAMER FOR WORKING PIPE
Filed Dec. 21, 1967 4 Sheets-Sheet 1

INVENTOR
DONALD E. BLAKE
BY Misegades & Douglas
ATTORNEYS

March 10, 1970  D. E. BLAKE  3,499,178
APPARATUS AND REAMER FOR WORKING PIPE
Filed Dec. 21, 1967  4 Sheets-Sheet 2

INVENTOR
DONALD E. BLAKE
BY
ATTORNEYS

United States Patent Office 3,499,178
Patented Mar. 10, 1970

3,499,178
APPARATUS AND REAMER FOR WORKING PIPE
Donald E. Blake, 761 Chestnut Ridge Road,
Morgantown, W. Va. 26505
Continuation-in-part of application Ser. No. 627,694,
Apr. 3, 1967. This application Dec. 21, 1967, Ser. No.
692,514
Int. Cl. B23b 19/02, 25/00; B21d 43/00
U.S. Cl. 10—107                                    9 Claims

ABSTRACT OF THE DISCLOSURE

An apparatus for use in combination with pipe working tools for the cutting, reaming and threading of pipe of larger diameters, i.e., diameters in excess of 2" and particularly diameters in the range of 2½"–6". The apparatus rotatably supports and establishes a driving connection between a pipe and a rotary power source such as a portable power vise and, being so supported and driven, the pipe may be cut, reamed and threaded in a single work set-up.

The pipe is rotatably supported on a head or platform by means of a roller vise, and the head in turn is rotatably mounted on a stand for rotation about two axes. A tool support arm is carried by the rotatable head and moves in unison with the head upon movement of the head about its axes. An adapter ring and universal joint drivingly connect one end of the pipe to the rotary power source. The universal joint eliminates the need of alignment between the axis of rotation of the pipe and the axis of rotation of the power source and, as the pipe is rotatably driven, the rotatable head moves about its axes in response to any eccentric rotation of the pipe and thereby affords automatic alignment between the rotating pipe and the roller vise.

A conventional pipe cutter is used in combination with the apparatus to cut the pipe, and the pipe is reamed by a novel reamer which can be selectively adjusted to ream pipe of several different sizes. Threading is accomplished by the use of a conventional geared threader.

---

This application is a continuation-in-part of my copending application Ser. No. 627,694, filed Apr. 3, 1967, now Patent No. 3,445,871, entitled "Apparatus, Reamer and Methods for Working Pipe."

This invention relates to a pipe working apparatus and, more particularly, to an apparatus especially suitable for use in combination with pipe working tools and a portable source of rotary power for the cutting, reaming and threading of pipe of larger diameters. The invention also relates to a new and improved reamer for use in reaming pipes of larger diameters and, more particularly, to a reamer having a cutting means which can be selectively adjusted so that the reamer can be used to ream pipes of several different sizes.

Presently in the plumbing trade, the cutting, reaming and threading of pipe of less than 2½" in diameter is accomplished rather quickly and easily in most instances by the use of a portable rotary power source commonly referred to as a power vise or power drive. This device is basically a motor driven chuck which is mounted on a stand or legs, and when used with pipe working tools, such as a cutter, a reamer and a die head, provides a readily available source of power for the cutting, reaming and threading of pipe up to 2" in diameter in a single work set-up. The power vise is a relatively lightweight and inexpensive piece of equipment which can be easily transported from job-to-job, and one which is owned and used by practically every plumber in the trade.

Due to its size and more particularly to the size of its chuck which can accommodate pipe only up to 2" in diameter, the power vise cannot be used as a power source for the cutting, reaming and threading of pipe of diameters in excess of 2", i.e., diameters ranging between 2½" and 6". The power drive can be used as a source of power for the threading only of this larger diameter pipe, if the threading is accomplished by means of a geared threader, but the cutting and reaming of such pipe must be done either through the use of other tools or other machinery or by hand, which of course necessitates a separate work set-up for the cutting and reaming operations and another separate work set-up for the threading operation. As is commonly done in most work situations, the larger diameter pipe is first cut and reamed by hand in one work set-up, and then the pipe is threaded with the power vise and geared threader in another work set-up. The two work set-ups, of course, result in a loss of time, and the hand cutting and reaming of the pipe involves great amounts of hard labor and many expensive man hours of time.

If the power vise is used in combination with a geared threader to apply threads to larger diameter pipe, additional or auxiliary equipment must be used with the geared threader to accomplish the threading operation. A universal drive shaft is one such piece of auxiliary equipment and it is used to provide a direct drive between the chuck of the power vise and the drive pinion of the geared threader. The geared threader can also be mounted-on or attached to the power vise with the drive pinion thereof being driven directly by the chuck of the power vise. This arrangement requires the use of a drive bar and adjustable pipe supports, as well as some other pieces of auxiliary equipment, and the geared threader remains fixed to the power vise with the die head of the threader also remaining fixed and the pipe being rotated by the work holder or barrel of the threader into thread-cutting engagement with the cutting dies. Such an arrangement requires near perfect axial alignment between the axis of rotation of the pipe and the axis of rotation of the barrel or work holder of the geared threader and setting-up or arranging the pipe and geared threader to attain such alignment requires a large expenditure of time. If such an alignment is not attained, binding or breaking of the threader die head will occur and the cutting of threads will be accompanied by excessive wear of the threader drive pinion and ring gear.

The cutting, reaming and threading of pipe of larger diameters in a single work set-up can be accomplished with some existing machines or devices, but such machines or devices constitute heavy pieces of equipment and, in addition, are most expensive. Such machines or devices are suitable for use only as fixed installations and, as a consequence, cannot be easily and inexpensively transported by a plumber from one job to another. Most plumbers, furthermore, cannot afford the capital investment involved in such machines or devices.

The present invention contemplates an inexpensive and light-weight apparatus adapted for use in combination with pipe working tools for the cutting, reaming and threading of pipe of larger diameters in a single work set-up using a conventional power vise as a source of power. The apparatus operates to rotatably support and establish a universal driving connection between a pipe and a power vise and, structurally, includes a stand which carries a platform or head rotatable about two axes. A roller vise for rotatably supporting and securing a pipe to be worked is carried by the rotatable head and the vise includes a plurality of rollers in combination with a means for urging the rollers into firm engagement with the pipe. One extremity of the pipe is connected to the chuck of the power vise through the medium of an adapter and a drive shaft with a universal joint therein. An adjustable tool support arm is also carried by the head and, when it is desired to cut, ream and thread the opposite extremity of the pipe, the tool support arm is employed to support the handles of the pipe working tools. The universal joint eliminates the need of exact alignment between the axis of rotation of the pipe and the axis of rotation of the power source and, as the pipe is rotatably driven, the rotatable head moves about its axes in response to any eccentric rotation of the pipe and thereby affords automatic alignment between the rotating pipe and the roller vise. With the rotating pipe and roller vise being so aligned, the pipe can be quickly, accurately and sequentially cut, reamed and threaded in a single work set-up.

The novel reamer of the present invention is comprised of a plate-like body member having a pair of handles and a pair of guide members mounted thereon. One of the handles carries a cutting blade which is adjustable relative to the body member with the blade being positioned in a slot in the body member intermediate the guide members. In use, the blade of the reamer is inserted into the end of a cut pipe with one of the guide members being positioned on the outer periphery of the pipe and the other of the guide members being positioned on the inner periphery of the pipe. With the pipe being power driven or power-rotated and the blade being adjusted so that the cutting edge thereof will engage the inner peripheral surface of the pipe, the burr on such inner peripheral surface can be quickly and easily removed.

Accordingly, one object of the present invention is to provide a portable and inexpensive apparatus which will afford the cutting, reaming and threading of pipe of larger diameters in a single work set-up.

Another object of the invention is to provide an apparatus which will afford power cutting, reaming and threading of pipe of larger diameters using a conventional power vise as a source of power.

Another object of the invention is to provide an apparatus for use in power cutting, reaming and threading of pipe which eliminates the need of alignment between the axis of rotation of the pipe being worked and the axis of rotation of the power source employed to drive the pipe.

Another object of the invention is to provide a selectively adjustable reamer which can be employed to ream pipes of different sizes.

Another object of the invention is to provide a reamer which will afford quick and easy reaming of power-driven pipes of larger diameters.

These and other objects of the present invention will become better understood from the following detailed description of one specific embodiment thereof when taken in connection with the accompanying drawings wherein like components are designated by like reference numerals throughout and wherein.

Figures 1, 8:
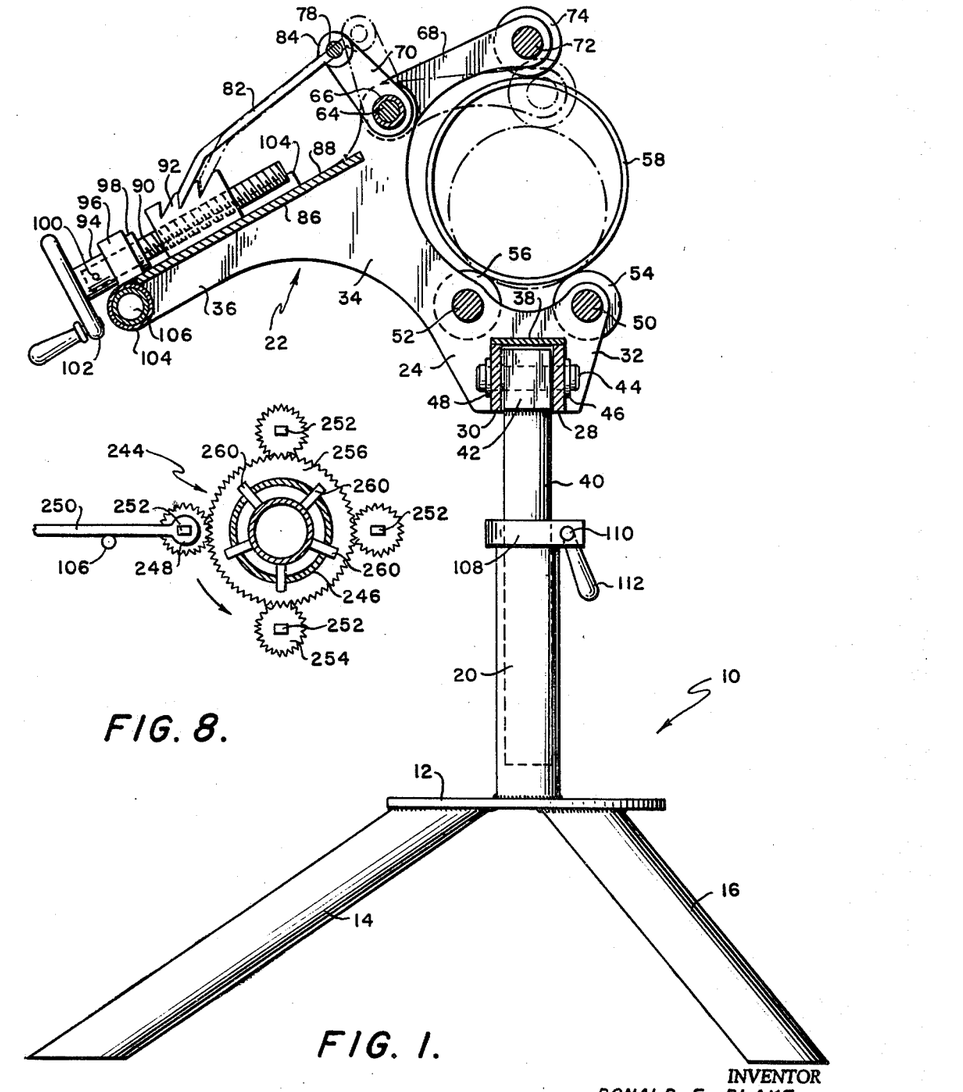
FIG. 1 is a partial section and end elevation illustrating some of the components of the apparatus and, in particular, the stand, the pipe supporting head and the roller vise.
FIG. 8 is a schematic representation illustrating the operation of a geared threader when used with the apparatus of the present invention.
Figures 2, 3:
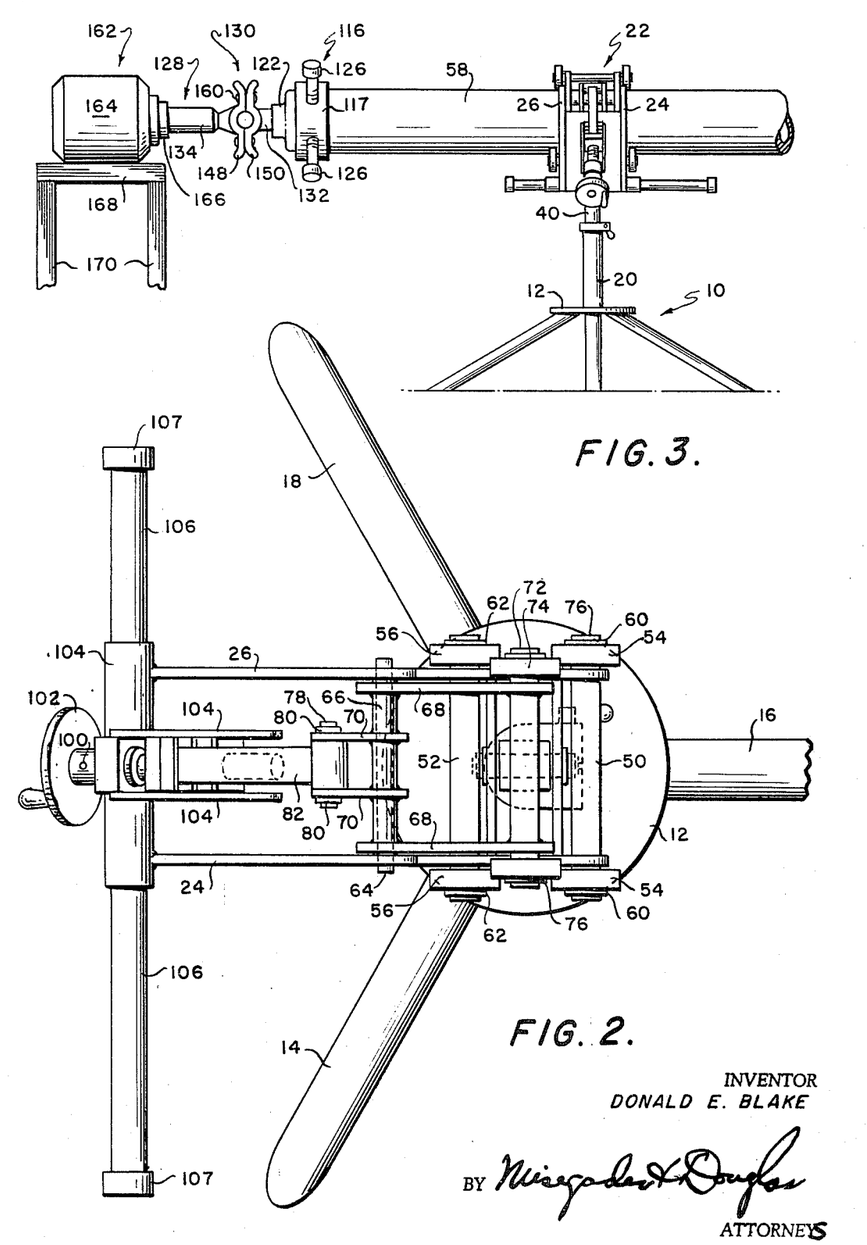
FIG. 2 is a to plan view illustrating the stand, the pipe supporting head, the roller vise and the tool support arm.
FIG. 3 is a side elevation of the apparatus illustrating a pipe being retained on the head by the roller vise and the pipe being drivingly connected to the power vise through the universal driving connection.

Referring more particularly to FIGS. 1, 2 and 3 of the drawings, the apparatus is shown as including a stand means or stand generally indicated by the reference numeral 10 and comprises of a base means or base member 12 which in this one specific embodiment of the invention takes the form of a flat, circular plate. A plurality of leg members or legs are secured to base member 12 and the legs in function are adapted to hold base members 12 in a substantially horizontally disposed position on a firm surface suih as a floor or the ground. Three leg members 14, 16 and 18 are employed in this particular instance and the leg members take the form of hollow cylinders with one end of each leg member being secured to the undersurface of base member 12. The three leg members are spaced approximately 120° apart on the base member 12 and both ends of each leg member are cut or formed at predetermined angles. The leg members are secured to the undersurface of the base member 12 by welding in this one specific embodiment of the invention, although it will be appreciated that any other suitable means of connecting the leg members to the base member could be employed.

Base member 12 carries an upstanding hollow column means or column member 20 on the upper surface thereof, one end of the upstanding column member being seated on the base member and being positioned thereon at the approximate geometric center thereof. The column member 20 is rigidly secured to the base member 12 by welding, although it will likewise be appreciated that any other suitable means of securing the two components could be employed.

Stand 10 carries a head means or pipe supporting head generally indicated by the reference numeral 22. The head 22 broadly serves as a platform or the like for supporting a pipe to be worked and, in this one specific embodiment of the invention, is comprised of a first pair of spaced and opposed plates 24 and 26, together with a second pair of spaced and opposed plates 28 and 30, the two pairs of plates being flat and being spaced a pre-selected distance apart. Plates 24 and 26 are identical in size and construction and both are irregularly shaped, each having a base portion 32, an intermediate portion 34 and an arm portion 36. Plates 28 and 30 are likewise identical in size and construction and are substantially rectangular shaped. Plates 28 and 30 extend substantially transversely of plates 24 and 26 and the ends of plates 28 and 30 are rigidly secured to the opposing inner faces of the base portions 32 of plates 24 and 26, the four plates being secured to each other by welding. Another substantially rectangular shaped plate 38 extends between plates 24 and 26 and the ends thereof are likewise secured to the opposing inner surfaces of plates 24 and 26 by welding. Plate 38 is also carried on plates 28 and 30 and is rigidly secured to the upper end walls (no reference numerals) of the two plates by welding. Plate 38 is function serves to add rigidity to the structure of the head 22.

Head 22 also includes a shaft means or shaft 40 which terminates at one end (the upper end) in a substantially cylindrical or cylindrical shaped head means or head 42. The head 42 is configured such that its longitudinal axis and the longitudinal axis of the remainder of shaft 40 intersect each other at an angle of substantially 90° and at its ends terminates in a pair of flat end walls (no reference numerals). Plates 28 and 30 are so spaced and the head 42 of shaft 40 is so dimensioned that the head fits snugly within or between the plates. Plates 28 and 30 are provided with aligned passages therein (no reference numerals) intermediate the ends thereof and the aligned passages are adapted to align with a passage (no reference numeral) in the head 42 on the shaft. A pivot means or shaft 44 is snugly received within the three aligned passages and is retained thereon by means of snap rings or split rings or the like 46 and 48 which are carried in annular recesses in the shaft (not shown) adjacent each end thereof, the snap rings 46 and 48 being so positioned abutting the outer surfaces of plates 28 and 30, respectively. The portion of shaft 40 below the head 42 thereon is slidably and rotatably received within hollow upstanding column member 20, shaft 40 and column member 20 being dimensioned so that shaft 40 is snugly received within the column member. With shaft 40 being so received within the column member and being so pivotally connected to plates 28 and 30, it can readily be seen that the pipe supporting head 22 is not only carried by or mounted on the stand 10 but is also supported for rotation about multiple axes, one of the axes being defined by shaft 44 and the other being defined by the axis of rotation of shaft 40.

A vise means or vise (no reference numeral) for rotatably supporting and securing a pipe to be worked is carried by head 22 and the vise means in this one specific embodiment of the invention takes the form of a roller vise. The roller vise includes a pair of shafts 50 and 52 which are carried in pairs of aligned passages or holes (no reference numerals) in the base portions 32 of plates 24 and 26. The two shafts 50 and 52 are reduced in diameter adjacent their ends and the reduced diameter end portions are adapted to carry roller means or rollers, rollers 54—54 being carried on shaft 50 and rollers 56—56 being carried on shaft 52. The rollers in this instance assume the form of four anti-friction bearings, although it will be appreciated that any other suitable form of roller could be employed. The rollers as essential components of the roller vise in function are adapted to rotatably support a pipe to be worked, such a pipe being shown in the drawings as being in engagement with the rollers and being designated by reference numeral 58. The shafts 50 and 52 have a length such that the pairs of rollers 54—54 and 56—56 are carried thereon exteriorly of plates 24 and 26, and the two shafts are rigidly secured to the two plates by welding.

The reduced diameter end portions on the shafts 50 and 52 result in the formation of shoulders (no reference numerals) on the shafts and the rollers carried on the reduced diameter end portions are adapted to abut the shoulders, the shoulders being positioned a short distance from the outer surfaces of plates 24 and 26 so that the rollers will not rub the outer surfaces of the plates when undergoing rotation. The rollers are retained on the shafts by means of pairs of snap rings 60—60 and 62—62, the snap rings being received in annular recesses (no reference numerals) in the shafts adjacent each end thereof. As best seen in FIG. 1, the shafts 50 and 52 are so positioned on plates 24 and 26 that the pairs of rollers carried thereon extend above the top wall of the base portions 32 of the two plates, and with the shafts 50 and 52 being so positioned, pipe 58 is rotatably supported on the pairs of rollers in a position such that it will not contact the plates 24 and 26 when rotated.

The roller vise also includes a rocker frame means or rocker frame which carries another pair of rollers for rotatably securing pipe 58 on the head 22. The rocker frame includes a shaft 64 which is snugly received within a pair of aligned passages or holes (no reference numerals) in the intermediate portions 34 of plates 24 and 26. Shaft 64 is retained in the aligned passages and is fixed against rotation therein by means of a keeper or the like (not shown) with the keeper being secured to the outer surface of plate 26 and having one end thereof seated within a slot in the shaft. A hollow shaft means or shaft 66 is rotatably carried on fixed shaft 64 and is dimensioned such that its length is slightly less than the distance between the inner faces of plates 24 and 26, the shaft 66 thus being capable of rotating freely on shaft 64.

A first pair of aligned arms 68—68 is carried on shaft 66 adjacent the ends thereof and the arms are spaced a predetermined distance apart and are rigidly secured to the shaft. Arms 68—68 each have passages therein (no reference numerals) adjacent one end thereof and shaft 66 is adapted to be snugly received within the passages. The arms 68—68 being so positioned on the shaft are secured to the shaft by welding. A second pair of aligned arms 70—70 is also carried on shaft 66 and the arms are carried on the shaft intermediate the arms 68—68. Arms 70—70 have passages therein (no reference numerals) adjacent one end thereof (the larger end) and shaft 66 is likewise snugly received within the passages. Arms 70—70 are likewise secured to shaft 66 by welding. The two pairs of arms 68—68 and 70—70 are angularly positioned on shaft 66 about 105° apart in this one specific embodiment of the invention or, as expressed in another manner are angularly positioned on the shaft such that their center lines when extended through the longitudinal axis of the shaft define an angle of approximately 105°.

Arms 68—68 adjacent their opposite ends are each provided with passages therein (no reference numerals) and the passages are adapted to snugly receive a shaft 72. Shaft 72 is rigidly secured to the two arms 68—68 by welding and adjacent its ends is reduced in diameter with the reduced diameter end portions (no reference numerals) defining a pair of shoulders (no reference numerals) on the shaft. A pair of rollers 74—74 are carried on the reduced diameter end portions of the shaft and the rollers when so positioned on the reduced diameter end portions abut the shoulders with the shoulders being spaced a slight distance from the outer surface of the arms so that the rollers 74—74 will not rub the arms when undergoing rotation. The two rollers 74—74 are retained on the shaft by means of a pair of snap rings 76—76 which are carried in a pair of annular recesses (not shown) in the shaft.

Arms 70—70 adjacent the opposite ends likewise have passages therein (no reference numerals) and the passages are adapted to receive a shaft 78. Shaft 78 is also retained in the passages by means of a pair of snap rings 80—80 carried in annular recesses (not shown) in the shaft adjacent the ends thereof. Shaft 78 rotatably carries a bar or link 82 with the link being reversely bent at one end 84 and being pivotally connected at this one end to the shaft. The function and purpose of the link 82 will be discussed in detail hereinafter.

The roller vise also includes a means to exert a force on the rocker frame to rotatably secure pipe 58 to the supporting head 22 and such a means in this one specific embodiment of the invention takes the form of a jackscrew and block. Head plates 24 and 26 carry a platform or plate 86 with plate 86 extending between the arm portions 36 of the plates and being rigidly secured by welding to the inner faces of the plates. The upper surface 88 of the plate is positioned substantially flush with the top surface of the arm portions 36 of the plates 24 and 26 and in configuration is substantially rectangular-shaped. Plate 86 extends substantially the entire length of the arm portions 34 of the two plates and, in addition to supporting the jackscrew and block, also adds rigidity to the pipe supporting head 22.

A jackscrew 90 and a block 92 are carried on plate 86 with the jackscrew 90 having a shank portion 94 which is rotatably received within a passage (no reference numeral) in a block 96 which is rigidly secured to plate 86, by welding in this particular instance. Jackscrew 90 is provided with an annular shoulder 98 thereon which is adapted to abut block 98 and the jackscrew shank portion 84 is retained in the passage in the block 98 by means of a pin 100 which secures a crank 102 to the end of the shank portion 94 of the jackscrew. Block 92 is provided with an internally threaded passage therein (no reference numeral) and is adapted to be carried on the threaded portion of the jackscrew, the jackscrew having right hand threads in this instance and the block 92 being movable axially of the threaded portion upon rotation of the jackscrew. The bottom surface of movable block 92 slidably engages the top surface 88 of plate 86 and the top surface of the block 92 is provided in this instance with three serrations or notches therein (no reference numerals). The movement of block 92 on plate 86 is guided by a pair of guide plates 104—104 which are carried on the top surface of plate 86. The guide plates 104—104 are spaced a predetermined distance apart and are rigidly secured to plate 86 by welding.

As best seen in FIG. 1, the opposite end of link 82 is chamfered and is adapted to seat or be received in one of the notches in block 92. As jackscrew crank 102 is rotated in a counterclockwise direction, it can readily be seen that the block 92 will be moved axially upwardly of the jackscrew and acting through the link will rotate the rocker frame clockwise about its fixed axis or shaft 64. With the rocker frame being so rotated, the rollers 74—74 carried on arms 68—68 will move into engagement with the peripheral surface of pipe 58. If crank 102 is turned until rollers 74—74 firmly engage the pipe 58, the pipe will then be secured on the head 22 and rotatably secured thereon between the three pairs of rollers 74—74, 54—54 and 56—56. The jackscrew and block will retain their positions due to the frictional engagement between their threads, and the pipe 58 will remain secured between the three pairs of rollers even when rotatably driven. If crank 102 is rotated in a clockwise direction, the block 92 will, of course, move axially downwardly of jackscrew 90 and the end of the link 82 can then be removed from the notch in the block wherein the rocker frame can then be rotated by hand in a counterclockwise direction to move the rollers 74—74 out of engagement with pipe 58. Pipes of different sizes can be rotatably secured on the supporting head 22 by merely positioning the end of link 82 in a different notch in block 92 as shown in phantom in FIG. 1. It will also be appreciated that pipes of different sizes can be rotatably secured to the head by varying the initial position of block 92 on the jackscrew before the link 82 is seated in one of the notches in the block.

Head 22 also carries tool support means for supporting the handles of the cutting, reaming and threading tools that are applied to a pipe to be worked. The tool support means in this one specific embodiment of the invention is comprised of an elongated hollow member or hollow cylinder 104 which is rigidly secured to the ends of the arm portions 36 of head plates 24 and 26. The ends of the arm portions are arcuately recessed (no reference numbers) so as to fit the peripheral contour of hollow cylinder 104 and the hollow cylinder is rigidly secured to the arcuate ends by welding. A rigid support means or tool support member 106 is slidably received within hollow cylinder 104, the tool support member 106 in this instance also assuming the form of an elongated hollow cylinder. The ends of tool support member 106 are threaded (threads not shown) and carry threaded end caps or the like 107—107 which prevent the tool support member 106 from becoming separated from hollow cylinder 104.

Means as also carried by the head 22 for selectively adjusting the height thereof relative to stand 10. Shaft 40 of the head carries a clamping means or clamp 108 which in this one specific embodiment of the invention takes the form of a split-collar having ends which are drawn together by a bolt 110 having a handle 112 on one end thereof. By turning handle 112 in the proper direction, clamp 108 may be rigidly secured on the shaft in any preselected position and when being so secured will support the head 22 on the column member by seating on the upper end wall (no reference numeral) of the column member. The height of the head 22 can thus be selectively varied by varying the position of clamp 108 on shaft 40.

Figures 4, 5, 6, 7:
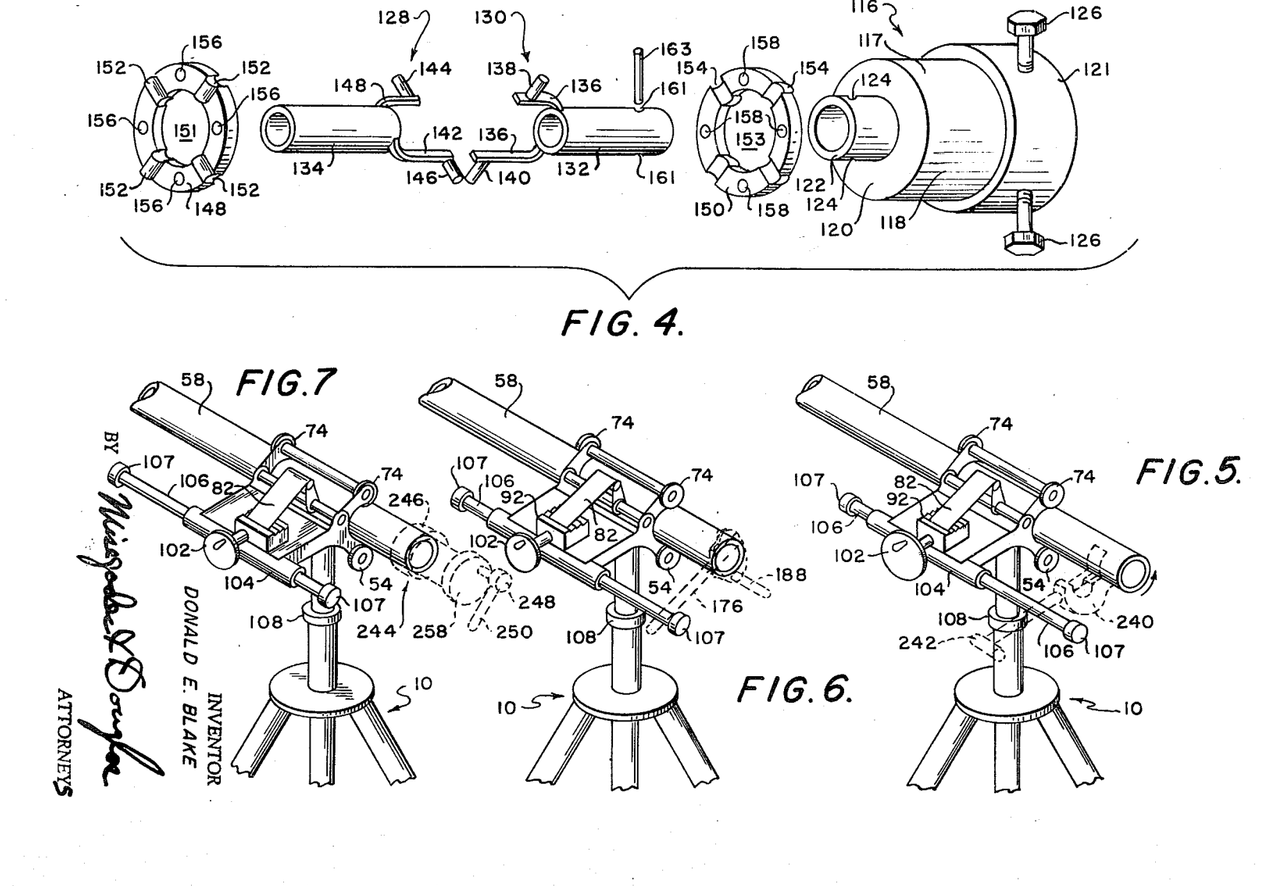
FIG. 4 is an exploded perspective view of the drive shaft, the universal joint and the adapter.
FIG. 5 is a fragmentary perspective view of the apparatus illustrating a cutting tool being applied to a pipe.
FIG. 6 is another fragmentary perspective view of the apparatus illustrating the reaming tool of the present invention being applied to a pipe.
FIG. 7 is another fragmentary perspective view illustrating the apparatus being used in a threading operation with a geared threader.

As best seen in FIGS. 3 and 4, the apparatus includes an adapter means or adapter generally designated by the reference numeral 116. The adapter 116 in this instance takes the form of a hollow cylinder or cylindrical member 117 having a side wall 118 and terminating at one end in an end wall 120. The opposite end of the cylindrical member is "open" and the thickness of side wall 118 adjacent the "open" end is increased to provide a collar or collar portion 121 on the side wall. The end wall 120 carries an elongated cylindrical boss or hub 122 and the hub is provided with an enlarged passage 123 therein which extends the length thereof and in this instance communicates with the interior of hollow cylindrical member 117. Passage 123 has a preselected diameter and hub 122 is provided with a pair of diametrically opposed passages 124—124 therein, the purpose of the passages to be mentioned hereinafter. The collar portion 121 of cylinder side wall 118 is provided in this instance with three circumferentially spaced holes therein (no reference numerals) and the holes are adapted to receive three bolts 126, the holes being threaded and extending substantially radially of the hollow cylinder and also being spaced approximately 120° apart. The adapter in this one specific embodiment of the invention is cast as an integral unit with the exception of bolts 126 and the formation of the threaded bolt holes and passages 124—124 therein, although it will be appreciated that it could be made of individual components which are rigidly held in assembly by welding or the like.

The end or extremity of pipe 58 remote from that being worked is received within the hollow cylinder 117 of the adapter and the end of the pipe is adapted to be rigidly connected to the hollow cylinder 117 by the three bolts, the three bolts being movable radially inwardly and outwardly of the hollow cylinder member. Needless to say, the inside diameter of hollow cylinder 117 should be slightly larger than the outside diameter of the largest size pipe with which the adapter is expected to be used.

The apparatus also includes means for providing a universal driving connection between the adapter and the source of rotary power, the universal driving connection in this instance taking the form of a drive shaft with a universal joint therein, the drive shaft being designated by reference numeral 128 and the universal joint being generally designated by the reference numeral 130. The drive shaft 128 having a universal joint therein is thus comprised of two shaft components 132 and 134. The universal connects the two shaft components 132 and 134 and some of the universal joint components are carried on the ends of the two shaft components in this particular instance.

One end of shaft component 132 carries L-shaped members 136—136 to the ends of which are connected two stub shafts 138 and 140. One end of shaft component 134 also carries L-shaped members 142—142 to the ends of which are connected two stub shafts 144 and 146. The four stub shafts are held in assembly to form a universal joint by a pair of plates 148 and 150, which plates are each provided with centrally disposed, enlarged apertures 151 and 153, respectively, therein. Each plate 148–150 is also provided with four radially extending recesses therein spaced approximately 90° apart, plate 148 being provided with four recesses 152 therein and plate 150 being provided with four recesses 154 therein. The four recesses in the two plates are adapted to receive the four stub shafts when the two plates are connected and held in close assembly my means of rivets 160 (FIG. 3). Holes 156 and 158 in the two plates receive the rivets 160. With the two plates riveted together, the components of the universal joint are held in assembly and the two shaft components can rotate about two axes defined by the pairs of stub shafts, which axes are spaced approximately 90° apart.

Shaft componet 132 is provided with a pair of diametrically opposed passages 161—161 therein adjacent its opposite end and is adapted to be slidably received within passage 123 in adapter hub 122. Passages 161—161 in the shaft component register or align with the passages 124—124 in the hub and the pairs of aligned passages are adapted to receive a pin or the like 163, the pin 163 providing a means to connect the two components and thus providing a means to connect the drive shaft 128 to the adapter 116. Pin 163 is retained in the pairs of aligned passages by means of a pair of snap rings (not shown).

The end of shaft component 134 is adapted to be received in the chuck of a portable rotary power source, i.e., a power vise or power drive. A typical power vise is shown in the drawings and is generally designed by the reference numeral 162. The power vise is basically comprised of a housing 164 which houses an electric motor and some gearing (now shown), and the motor acting through the gearing drives a chuck 166 which is adapted to hold or grip a small diameter pipe or, in this instance, shaft component 134. Housing 164 is mounted on a platform or the like 168 and the platform is supported by four legs 170 (only two shown). The power vise is a lightweight and inexpensive piece of equipment and can easily be transported from one work location to another. Power vises are owned and used by practically all plumbers in the trade, and several different models are commercially available. The structural details per se of the power vise form no part of the present invention, needless to say.

Figures 9, 11:
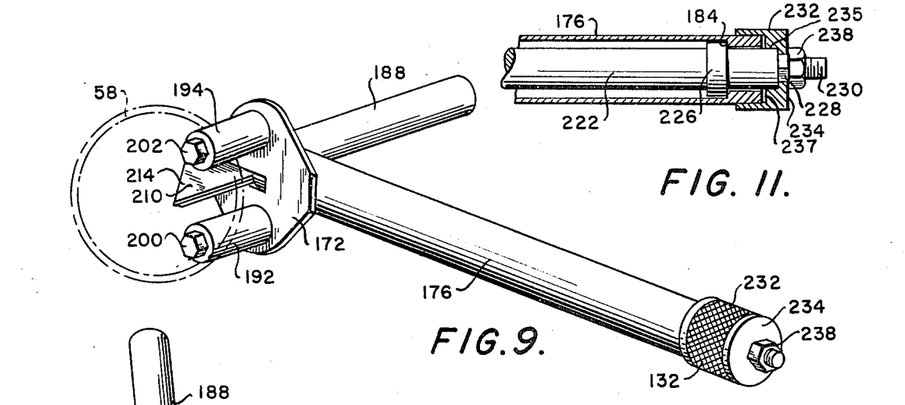
FIG. 9 is a perspective view of the reamer.
FIG. 11 is a partial longitudinal section through one of the handles of the reamer.
Figure 10:
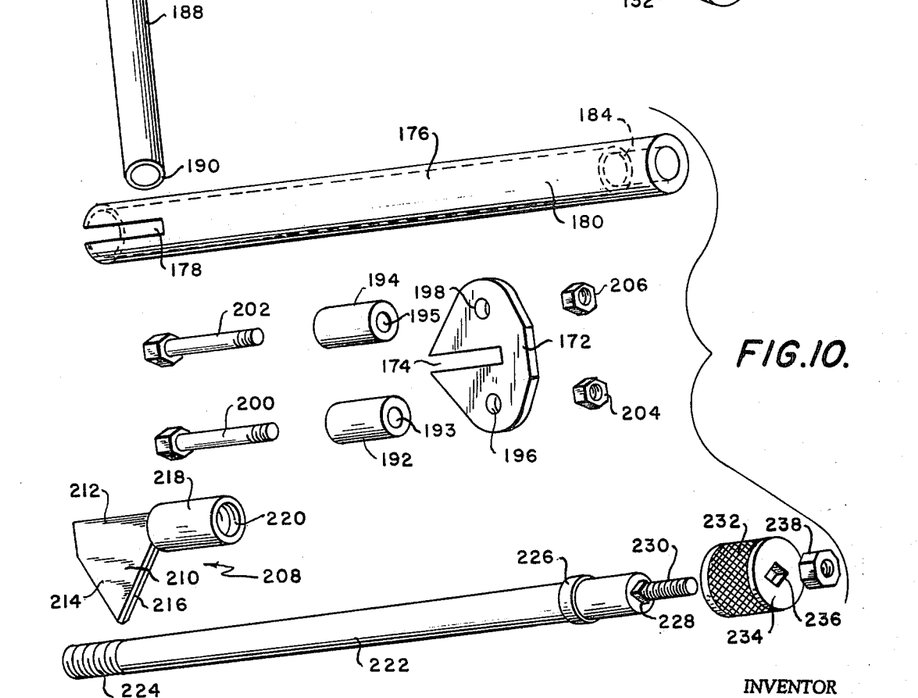
FIG. 10 is an exploded perspective view of the reamer illustrating all of the components thereof.

Referring now to FIGS. 9, 10 and 11, the reamer of the present invention is comprised of a body member 172 which in this one specific embodiment of the invention takes the form of a substantially heart shaped flat plate. Plate 172 is provided with an elongated substantially rectangular shaped slot 174 therein with the slot 174 extending to one edge of the plate.

The reamer also includes a pair of handle means or handles, one such handle being designated by reference numeral 176 and taking the form of an elongated hollow cylinder. Handle 176 is provided with an elongated substantially rectangular shaped slot 178 therein at one end thereof, the slot 178 extending through the side wall of the handle and also extending to the end of the handle. Handle 176 is adapted to be rigidly secured to one face of body member 172 with the slot 178 in the handle registering or being aligned with the slot 174 in the body member. Handle 176 is rigidly secured to the body member by welding and one end thereof is counterbored, a counterbore 180 being formed in the handle at the slotted end thereof and resulting in the formation of an annular shoulder 184 within the handle a predetermined distance from the opposite end thereof.

The second handle of the pair of handles is designated by the reference numeral 188 and this handle also takes the form of a hollow elongated cylinder. One end 190 of handle 188 is rigidly secured by welding to handle 176 adjacent the slotted end thereof and when being so secured to handle 176 extends substantially normal to handle 176 and to body member 172.

A guide means or guide is carried by body member 172 and the guide means in this one specific embodiment of the invention takes the form of a pair of rollers 192 and 194 which are adapted to be rotatably secured to the opposite face of plate-like body member 172. Body member 172 is provided with a pair of spaced passages or holes 196 and 198 therein and the rollers 192 and 194 are provided with axially extending passages 193 and 195 respectively therein, the passages in the rollers and the plate being adapted to receive a pair of bolts 200 and 202 which rotatably secure the rollers to the plate. A pair of nuts 204 and 206 are carried by the bolts 200 and 202 for securing the rollers to the plates. Rollers 192 and 194 are spaced a predetermined distance apart and, of course, are positioned on the plate on opposite sides of the slot 174 therein.

The reamer also includes a blade means which is generally indicated by the reference number 208 and which is comprised of a flat plate-like blade 210 having a substantially rectangular-shaped body portion 212 and a substantially triangular shaped nose portion 214, the nose portion having a cutting surface 216 formed along one side or edge. The blade means also includes a hollow cylindrical member 218 which is carried by the blade 210 with one end of the hollow cylindrical member being rigidly secured by welding to one side of the substantially rectangular shaped body portion of the blade 212. The inner periphery of the hollow cylinder member 218 is provided with threads 220 therein and hollow cylindrical member 218 is adapted to be slidably received within counterbore 180 in handle 176. With hollow cylindrical member 218 of the blade means being received within counterbore 180, the blade 210 will, of course, be snugly received in and extend through the aligned retangular shaped slots 178 and 174 in the handle and body member and the nose portion 214 of the blade will thus be positioned intermediate the guide rollers 192 and 194 and extend substantially normal to the plate-like body member 172.

The reamer also includes an adjustment means for selectively varying the position of the blade 210 within the slots 174 and 178. The adjustment means in this one specific embodiment of the invention takes the form of an elongated rod 222 having threads 224 on one end and having a shoulder 226 thereon a predetermined distance from the opposite end. Rod 222 is adapted to be received within handle 176 with the threaded end 224 thereof being received within the threaded inner periphery 220 of hollow cylindrical member 218 of the blade means. Shoulder 226 on rod 222 is adapted to seat on internal shoulder 184 within the handle and the two shoulders thus determine the depth of insertion of the rod within the handle. The opposite end of rod 222 terminates in a substantially square shaped boss 228 and a reduced diameter threaded portion 230 extending therefrom, counterbore 180 in handle 176 having a depth such that the end of rod 222 as well as the square shaped boss 228 and the threaded portion 230 carried thereon extend slightly beyond the open end of the handle.

A cup shaped end cap 232 having an end wall 234 is carried on the end of rod 222 and end wall 234 internally of the end cap is counterbored at 235, the counterbore extending substantially axially of the end cap and defining an annular shoulder 237 within the end cap as well as a seat (no reference numeral) within the end cap for the end of rod 222. The end wall 234 is also provided with a substantially square-shaped passage 236 therein which communicates with counterbore 235, and the passage 236 is adapted to receive the square-shaped boss 228 and the reduced diameter threaded portion 230 on rod 222. A nut 238 is threadedly received on threaded portion 230 to rigidly secure the end cap 232 to the end of rod 122 and, when the nut 238 is tightened against the end cap as shown in FIG. 11, the shoulder 226 or rod 222 will be drawn into engagement with shoulder 184 in the handle 176 and the rod and handle will thereby be held in assembled engagement. It will also be noted in FIG. 11 that the end of rod 222 seats against the end cap end wall in counterbore 235 and that there is a slight clearance between shoulder 237 in the end cap and the end wall of handle 176. It will furthermore be noted in FIG. 11 that the outer peripheral surface of the side wall of the end cap is knurled and that the inner periphery of the end cap side wall snugly and slidably engages the outer peripheral surface of handle 176.

When the end cap 232 is rotated in a clockwise direction, it can readily be seen that the threaded portion 224 on the rod will move the blade 210 to the right as shown in FIG. 9 within the slots 174 and 178 and will thus vary the position of the blade within the slots. If the end cap 222 is rotated in a counterclockwise direction, the blade 210 will, of course, be moved in the opposite direction in the aligned slots 174 and 178 in the body member and handle. FIG. 9 shows the reamer positioned in the end of pipe 58 with the blade 210 being held in a position between guide rollers 192 and 194 to remove a burr from the inner peripheral edge of the pipe. It will be noted that the upper roller 194 is positioned against the outer peripheral surface of the rotating pipe and that the lower guide roller 192 is in engagement with the inner peripheral surface of the pipe. By merely rotating end cap 232 in a clockwise direction, the cutting edge 216 of the blade 210 can be brought into contact with the inner peripheral edge of the rotating pipe to remove the burr therefrom. The amount of material to be removed from the inner peripheral edge of pipe 58 can be accurately controlled by merely controlling the degree or amount of rotation of the end cap.

In using the apparatus of the present invention to cut, ream and thread a larger diameter pipe, for instance a 6″ pipe, one extremity of the pipe is first inserted into the hollow cylinder 117 of adapter 116. The three bolts 126 are threaded inwardly into engagement with the pipe until the adapter 116 is rigidly secured to the pipe. The pipe need not be accurately centered in hollow cylinder 117 by the bolts 126. Shaft component 134 is then inserted into the chuck of the power vise 162 and the chuck jaws tightened thereon. Conversely, the shaft component 134 could first be secured in the chuck and then the adapter fastened to the pipe.

Pipe 58 adjacent the extremity thereof to be worked is then placed on the pairs of rollers 54—54 and 56—56 of the roller vise. Arms 68—68 of the rocker frame are then rotated counterclockwise to move rollers 74—74 into engagement with the outer peripheral surface of the pipe as shown in FIG. 1. The end of link 82 is then seated in one of the notches in jackscrew block 92 and the jackscrew handle 102 is then turned in a counterclockwise direction to move rollers 74—74 into firm engagement with the pipe 58 to thereby rotatably secure the pipe 58 on the head 22. Rollers 74—74 must not be urged too tightly into engagement with the pipe 58 by the jackscrew or they will have a tendency to move or "walk" along the pipe when the pipe is rotated. On the other hand, if the jackscrew does not exert enough force on the rollers 74—74, the pipe 58 will not be held tightly enough against the rollers 54—54 and 56—56 and the pipe will thus not move in unison with the rotatable head.

The motor of the power vise is then turned on or energized and the pipe 58 will be rotated or driven by chuck 166 acting through the universal joint 130 and adapter 116. The tool support member 106 is then slid or moved to the right, as shown in the drawings, and the portion of pipe 58 projecting beyond or extending to the right of the heat 22 and the roller vise carried thereby is now ready to be worked.

FIG. 5 shows the apparatus of the present invention being employed in a cutting operation. A conventional cutting tool 240 is first placed on the pipe at the point thereon wherein it is desired to make a cut or in the position shown in the drawings with the handle 242 of the cutting tool resting on tool support arm 106. With the pipe 58 being rotated in a counterclockwise direction, as viewed from the end of the pipe being worked, the handle of the cutting tool is rotated to move the disc or blade (no reference numeral) of the cutting tool into cutting engagement with the periphery of the pipe. The handle of the cutting tool is rotated until the pipe is completely severed or cut.

FIG. 6 shows the apparatus being used in a reaming operation to remove the burr from the inner peripheral edge of a cut pipe. With the power vise 162 being energized to again drive pipe 62 in a counterclockwise direction, the reamer of the present invention is applied to the end of the pipe 58 as hereinbefore described. Handle 176 of the reamer rests on tool support arm 106 during the the reaming operation and handle 188 is held by the hand of an operator. As end cap 232 is rotated clockwise to move the blade 210 into engagement with the inner-peripheral edge of the pipe, handle 186 may also be canted slightly to move the cutting edge 216 of the reamer blade 210 into a firm cutting engagement with the inner-peripheral edge of the pipe. The cutting edge of the blade will then quickly remove the burr from the inner peripheral edge of the pipe.

Following the reaming operation, the pipe is next threaded. FIGS. 7 and 8 show pipe 58 being threaded with a conventional geared threader 244 to apply a right hand thread thereto. The barrel 246 of the threader is first placed upon the end of the pipe whereupon it is centered on the pipe and is then rigidly attached thereto by means of a set screw (not shown), the set screw thus rigidly anchoring the threader to the end of the pipe. A ratchet 248 having a handle 250 thereon is then placed on the squared end 252 of the shaft on the threader drive pinion 254 with the ratchet being set to prevent rotation of the drive pinion shaft about its own axis and the handle 250 being slidably supported on and abutting tool support arm 106. The power vise 162 is then energized to rotate the pipe 58 again in a counterclockwise direction as shown in FIGS. 7 and 8. With the pipe 58 being so rotated, the threader ring gear 256 will also be rotated in a counterclockwise direction and the drive pinion 254, being fixed against rotation about its own axis, will at the same time move in orbit about the ring gear also in a counterclockwise direction as best shown in FIG. 8. The orbital movement of the drive pinion 254 and its drive shaft will produce rotary movement of the threader die head 258 in a counterclockwise direction and the thread cutting dies 260 will thus be rotated and moved axially inwardly of the end of pipe 58 to cut the desired threads on the outer periphery thereof. The cutting dies will be moved axially inwardly of the pipe 58 in spite of the fact that the dies and the pipe 58 are both rotated counterclockwise inasmuch as the die head 258 and the drive pinion 254 will be rotating at a greater speed than the ring gear 256 and the pipe 58. The drive pinion 254 having a much smaller number of teeth thereon than the ring gear 256 will have an orbital speed far greater than the rotational speed of the pipe and ring gear and will thus rotate the die head and dies at a speed in excess of the rotational speed of the pipe and ring gear.

In cutting, reaming and threading operations using the apparatus of the present invention, the axis of rotation of pipe 58 need not be aligned with the axis of rotation of the power source, nor need the pipe be accurately centered in the adapter 116. The action of the universal joint will insure that the pipe 58 will be driven by the power source 162 even if the pipe and power source are out of alignment by a large number of degrees either in a horizontal or vertical plane or both. The action of the universal joint will also serve to minimize the eccentricity that is induced into the rotated pipe as a result of any misalignment between the pipe and power source.

The action afforded by head 22 will further serve to minimize if not substantially eliminate the eccentricity in the pipe at the extremity thereof being worked. With the pipe 58 being firmly and rotatably secured to the head 22 by the vise means, the head will move or rotate about its axes in response to any eccentric rotation of the pipe and in so doing will not only duplicate the eccentric rotation of the pipe but will enable the pipe to remain firmly in rotatable engagement with the pairs of rollers 54—54, 56—56 and 74—74 of the vise means. The movement of the head 22 about its axes in response to eccentric rotation of the pipe will thus automatically align the pipe and the vise means and will enable the rotatably driven pipe to be accurately and sequentially cut, reamed and threaded. It will also be appreciated that any movement of the head 22 in response to eccentric rotation of the pipe 58 will produce a corresponding movement of the tool support arm 106. With the handles of the cutting, reaming and threading tools being supported on the tool support arm, the tools will thus move in unison with the head and will not be affected by any eccentric rotation of the pipe.

It will also readily be appreciated that, once the pipe 58 is drivingly connected to the power source 162 and rotatably secured in the vise means, it need not be removed from the apparatus of the present invention for separate work operations. In other words, the pipe may be quickly, accurately and sequentially cut, reamed and threaded in a single work set-up.

Use of the apparatus of the present invention has demonstrated that cutting time in the case of 2½" pipe is reduced by more than 50% over cutting by hand. In the case of 6" or larger pipe, cutting time is reduced in excess of 90%.

The use of the apparatus and reamer of the present invention has also demonstrated that reaming time in the case of 2½"–4" pipe is reduced by at least 50% over conventional methods. In the case of even larger diameter pipe, reaming time is reduced in excess of 90%.

The apparatus and reamer herein described and shown in the drawings are made or constructed of steel in this one specific embodiment of the invention, with the blade of the reamer, of course, being made of tool steel. Other than the blade of the reamer, however, the apparatus and reamer could be constructed of any other suitable material. The apparatus and reamer of the present invention will find primary usage or utility in the plumbing trade but, as will readily be apparent, could also be used in any other trade or work situation wherein it is desired to cut, ream and thread pipe or conduit. Moreover, while the apparatus and reamer of the present invention have particular utility in working pipe in diameter ranges of 2½"–6", it will also be readily apparent that pipe having diameters of less than 2½" or greater than 6" could be worked with equal facility using the apparatus and reamer.

While the apparatus has been shown and described herein as having especial utility in the threading of pipe, it will also be appreciated that it could be employed with equal facility for the threading of solid cylindrical stock having diameters similar to those mentioned above. Further, while the apparatus has been shown and described herein as being especially suitable for use in connection with a portable rotary power source such as a power vise, it will likewise be appreciated that it could also be used with a permanently situated power source such as a bench mounted motor driven chuck or the like.

Additional embodiments of the invention in this specification will occur to others and therefore it is intended that the scope of the invention be limited only by the appended claims and not by the embodiment described hereinabove. Accordingly, reference should be made to the following claims in determining the full scope of the invention.

What is claimed is:

1. Apparatus for supporting a rotating pipe for the cutting, reaming and threading thereof with said pipe being drivingly connected to a source of rotary power, said apparatus comprising:
    stand means adapted to be positioned on a firm surface;
    head means rotatably carried by said stand means for rotation about multiple axes;
    vise means carried by said head means for rotatably supporting and securing said pipe on said head means;
    said vise means including roller means for rotatably supporting said pipe on said head means and roller means pivotable about a fixed axis for rotatably securing said pipe on said head means;
    tool support means carried by said head means;
    adapter means rigidly connected to one end of said pipe; and
    means providing a universal driving connection between said adapter means and said source of rotary power;
    said means providing said universal driving connection between said adapter means and said source of rotary power eliminating the need of alignment between said rotating pipe and the axis of rotation of said power source;
    said head means being movable about said multiple axes in response to eccentric rotation of said pipe and being operable to afford automatic alignment between said vise means and said pipe whereby the opposite end of said pipe may be accurately and sequentially cut, reamed and threaded in a single work set-up by the application of pipe working tools thereto.

2. Apparatus as claimed in claim 1 further including means carried by said head means and being cooperable with said stand means for selectively adjusting the height of said head means.

3. Apparatus as claimed in claim 1 wherein said stand means is comprised of:
    a plate-like base member;
    a plurality of legs rigidly secured to the undersurface of said plate-like base member for supporting said base member in a substantially horizontally disposed position on said firm surface;
    a hollow substantially upright column member rigidly secured to the upper surface of said plate-like base member;
    said substantially upright column member being secured to said upper surface of said base member at the approximate geometric center thereof.

4. Apparatus as claimed in claim 3 wherein said head means is comprised of:
    a first pair of irregularly shaped and opposed plate-like members;
    a second pair of opposed plate-like members extending substantially transversley of said first pair of opposed members;
    said first and second pairs of opposed plate-like members being rigidly secured to each other and spaced a predetermined distance apart;
    said second pair of opposed plate-like members having aligned passages therein intermediate the ends thereof;
    shaft means having a substantially cylindrical head with a passage extending through said cylindrical head;
    said cylindrical head on said shaft means being snugly received within said second pair of opposed plate-like members;
    pivot means carried within said passage in said cylindrical head and said aligned passages in said second pair of opposed plate-like members;
    said pivot means pivotally connecting said cylindrical head of said shaft means and said second pair of plate-like members and defining one axis of rotation of said head means;
    the portion of said shaft means extending below said cylindrical head being slidably and rotatably received within said hollow upright column member of said stand means;
    the axis of rotation of said shaft means within said hollow cloumn member thereby defining a second axis of rotation for said head means.

5. Apparatus as claimed in claim 4 wherein said vise means is comprised of:
    a pair of shafts carried by said first pair of plate-like members and extending substantially transversely thereof;
    rollers carried on each shaft adjacent each end thereof with the rollers being operable to support said rotating pipe on said head means;
a rocker frame including first and second pairs of arms pivotally connected to said first pair of plate-like members for rotation about a fixed axis;
a shaft carried by said first pair of arms of said rocker frame;
rollers carried on said shaft adjacent each end thereof;
a shaft carried by said second pair of arms of said rocker frame;
a link pivotally connected at one end to said shaft carried by said second pair of arms;
a platform carried by said first pair of plate-like members;
a screw rotatably mounted on said platform;
a block rotatably carried on said screw and being slidably movable in opposite directions on said platform upon rotation of said screw;
said block having a plurality of notches in the upper surface thereof with the opposite end of said link being adapted to seat in one of said notches;
said screw and block being operable when said screw is rotated in one direction and the opposite end of said link is seated in one of the said notches in said block to rotate said rocker frame about said fixed axis and urge said rollers carried on said shaft carried by said first pair of arms into firm engagement with the peripheral surface of said rotating pipe to thereby rotatably secure said rotating pipe on said head means;
said screw being operable when rotated in the opposite direction to move said block to a position where said opposite end of said link can be moved from the notch in said block and said rocker frame can be rotated about said fixed axis in a direction to move said rollers carried on said shaft carried on said first pair of arms out of engagement with said pipe.

6. Apparatus as claimed in claim 1 wherein said adapter means is comprised of:
a hollow member having a side wall with a collar portion and having an end wall in one end thereof and being "open" at the opposite end thereof; and
a plurality of bolts carried in the collar portion of said side wall of said hollow member for threated movement inwardly thereof into engagement with said pipe;
said "open" end of said hollow member receiving said one end of said pipe and said bolts being operable to rigidly connect said hollow member and said one end of said pipe.

7. Apparatus as claimed in claim 6 wherein said hollow member takes the form of a hollow cylinder having an internal diameter larger than the external diameter of said pipe; and
wherein said bolts are circumferentially spaced about the collar portion of said side wall of said hollow cylinder and are threadly connected to said collar portion for movement substantially radially inwardly and outwardly of said hollow cylinder.

8. Apparatus as claimed in claim 7 wherein said means providing a universal driving connection between said adapter means and a source of rotary power is comprised of a drive shaft with a universal joint therein, one end of said drive shaft being drivingly connected to a hub carried on the end wall of said hollow member and the other end of said drive shaft being drivingly connected to said source of rotary power.

9. Apparatus as claimed in claim 5 wherein said tool support means takes the form of:
an elongated hollow member rigidly secured to said first pair of opposed plate-like members of said head means and extending substantially transversely of said plate-like members; and
a rigid support member slidably received within said elongated hollow member and being movable therein in opposite directions;
said rigid support member being operable to support the handles of said cutting, reaming and threading tools.

References Cited

UNITED STATES PATENTS

| 705,538 | 7/1902 | Lake et al. | 10—87 |
| 1,024,256 | 4/1912 | Greene | 10—107 |
| 1,126,792 | 2/1915 | LaVoo | 10—87 |
| 1,510,084 | 9/1924 | Brainerd et al. | 10—89 |
| 1,947,874 | 2/1934 | Pealer | 10—87 |
| 2,810,141 | 10/1957 | Langston | 10—87 |
| 3,270,592 | 9/1966 | Behnke | 10—87 |
| 3,413,667 | 12/1968 | Behnke | 10—107 |

FOREIGN PATENTS 546,709  4/1956  Belgium.

CHARLES W. LANHAM, Primary Examiner

E. M. COMBS, Assistant Examiner

U.S. Cl. X.R.

10—87, 89; 82—4.3